(12) United States Patent
Chen (10) Patent No.: US 11,725,684 B2
(45) Date of Patent: Aug. 15, 2023

(54) SCREW STRUCTURE REDUCING WEAR AND SLIP OF WASHER

(71) Applicant: Wei-Chih Chen, Taichung (TW)

(72) Inventor: Wei-Chih Chen, Taichung (TW)

( * ) Notice: Subject to any disclaimer, the term of this patent is extended or adjusted under 35 U.S.C. 154(b) by 182 days.

(21) Appl. No.: 17/464,798

(22) Filed: Sep. 2, 2021

(65) Prior Publication Data
US 2023/0061473 A1    Mar. 2, 2023

(51) Int. Cl.
*F16B 35/00* (2006.01)
*F16B 43/00* (2006.01)

(52) U.S. Cl.
CPC .......... *F16B 35/00* (2013.01); *F16B 43/001* (2013.01)

(58) Field of Classification Search
CPC ........ F16B 35/007; F16B 35/04; F16B 35/06; F16B 35/00
USPC ......................................... 411/378
See application file for complete search history.

(56) References Cited

U.S. PATENT DOCUMENTS

| | | | | |
|---|---|---|---|---|
| 2,037,586 | A * | 4/1936 | Olson | F16B 39/282 |
| | | | | 411/959 |
| 9,086,088 | B2 * | 7/2015 | Walther | F16B 35/065 |
| 9,695,860 | B2 * | 7/2017 | Pieciak, Jr. | F16B 25/0042 |
| 11,035,399 | B2 * | 6/2021 | Truong | F16B 31/02 |
| 2006/0257229 | A1 * | 11/2006 | Bucciferro | F16B 35/065 |
| | | | | 411/187 |
| 2011/0170983 | A1 * | 7/2011 | Day | F16B 39/24 |
| | | | | 472/137 |
| 2011/0316532 | A1 * | 12/2011 | Kuntner | F16B 31/02 |
| | | | | 411/378 |
| 2012/0266560 | A1 * | 10/2012 | Panasik | F16B 35/065 |
| | | | | 411/387.4 |
| 2013/0130563 | A1 * | 5/2013 | Giraud | F16B 35/041 |
| | | | | 439/784 |
| 2013/0185917 | A1 * | 7/2013 | Diehl | F16B 39/282 |
| | | | | 411/166 |
| 2013/0251476 | A1 * | 9/2013 | Pinzl | F16B 31/00 |
| | | | | 411/378 |
| 2014/0334898 | A1 * | 11/2014 | Taylor | F16B 35/06 |
| | | | | 411/413 |
| 2020/0040935 | A1 * | 2/2020 | Juengel | B60T 17/043 |
| 2021/0008807 | A1 | 1/2021 | Woodworth | |

\* cited by examiner

*Primary Examiner* — Gary W Estremsky
(74) *Attorney, Agent, or Firm* — Alan D. Kamrath; Karin L. Williams; Mayer & Williams PC (57) ABSTRACT

A screw structure includes a screw and a washer mounted on the screw. The bottom face of the screw head is provided with a plurality of pressing portions. Each of the pressing portions has a top provided with a first plane and a bottom provided with a second plane having an area smaller than that of the first plane. Each of the pressing portions is provided with a first inclined face and a first steep arcuate face. The first inclined face is directed toward a clockwise direction of the screw when the screw is screwed. The first steep arcuate face is directed toward the external thread. When the screw is screwed into an article, the pressing portions press the washer, and an outer diameter of the washer is expanded outward and forms an expansion.

3 Claims, 7 Drawing Sheets

SCREW STRUCTURE REDUCING WEAR AND SLIP OF WASHER

BACKGROUND OF THE INVENTION

1. Field of the Invention

The present invention relates to a fastener and, more particularly, to a screw structure or assembly.

2. Description of the Related Art

A conventional screw structure comprises a screw and a washer mounted on the screw. When the screw is rotated by a driving tool, such as a pneumatic appliance, the screw is screwed into an article, such as a corrugated board for baking paint. When the washer is pushed by the screw to touch the article, the washer is sandwiched between the head of the screw and the article to provide an sealing effect. Thus, the washer provides an airtight and watertight effect between the head of the screw and the washer, to prevent the ambient air or liquid from entering the inner face of the article. However, when the screw and the washer are not disposed at a parallel state, the washer is easily deflected due to rotation of the screw, and produces a gap between the screw and the washer, so that the air or liquid will permeate through the bottom of the screw head into the inner face of the article, thereby decreasing the sealing effect. In addition, when the screw is tightened and locked onto the article, the washer is easily worn out due to a frequent rubbing between the screw and the washer. Further, the washer easily slips out during rotation of the screw.

The closest prior art reference of the conventional screw structure was disclosed in the Applicant's U.S. Patent Publication No. 2021-0088072, and comprises

BRIEF SUMMARY OF THE INVENTION

The primary objective of the present invention is to provide a screw structure reducing wear and slip of a washer.

Another objective of the present invention is to provide a screw structure having anti-leaking or anti-seepage function.

In accordance with the present invention, there is provided a screw structure comprising a screw and a washer mounted on the screw. The screw includes a screw head, a rotation portion, and a shank. The rotation portion is mounted on a top face of the screw head. The shank is mounted on a bottom face of the screw head. The shank is provided with an external thread. The bottom face of the screw head has a periphery provided with a flange. The flange has an interior provided with a groove. The bottom face of the screw head is provided with a plurality of pressing portions. The pressing portions are located between the shank and the groove. Each of the pressing portions has a trapezium shape with a wide top and a narrow bottom. Each of the pressing portions has a top provided with a first plane and a bottom provided with a second plane having an area smaller than that of the first plane. Each of the pressing portions is provided with a first inclined face and a first steep arcuate face. The first inclined face is directed toward a clockwise direction of the screw when the screw is screwed. The first steep arcuate face is directed toward the external thread. When the screw is screwed into an article, the pressing portions press the washer, and an outer diameter of the washer is expanded outward and forms an expansion.

Preferably, each of the pressing portions is provided with a second inclined face and a second steep arcuate face, the second inclined face is directed toward a counterclockwise direction of the screw when the screw is unscrewed, and the second steep arcuate face is directed toward the flange.

Preferably, a first angle is defined between the first inclined face and the first plane, a second angle is defined between the second inclined face and the first plane, a third angle is defined between the first steep arcuate face and the first plane, and a fourth angle is defined between the second steep arcuate face and the first plane.

According to the primary advantage of the present invention, when the screw is screwed into the article, the pressing portions of the screw apply a force on the washer so that the washer is deformed elastically, thereby enhancing the sealing effect of the washer.

According to another advantage of the present invention, when the screw is rotated relative to the washer, the washer is gradually moved along the first inclined face to the second plane of each of the pressing portions, so that the washer will not be rotated in concert with the screw and will not be worn out easily.

According to a further advantage of the present invention, the washer will not slip out easily by provision of the first steep arcuate face of each of the pressing portions.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-6, a screw structure in accordance with the preferred embodiment of the present invention comprises a screw 10 and a washer 20 mounted on the screw 10.

The screw 10 includes a screw head 11, a rotation portion 12, and a shank 131. The rotation portion 12 is mounted (or formed) on the center of a top face of the screw head 11 and is perpendicular to the screw head 11. The rotation portion 12 has a hexagonal shape. A driving tool is mounted on the rotation portion 12 to drive the rotation portion 12 which is driven to rotate the screw 10. The shank 131 is mounted (or formed) on the center of a bottom face 13 of the screw head 11. The shank 131 is provided with an external thread 14. The bottom face 13 of the screw head 11 has a periphery provided with a flange 15. The flange 15 has an interior provided with a groove 16 having an annular shape.

The bottom face 13 of the screw head 11 is provided with a plurality of pressing portions 17. The pressing portions 17 are located between the shank 131 and the groove 16. The pressing portions 17 are arranged to form an annular shape and are distant equally from each other. Each of the pressing portions 17 has a trapezium (or trapezoid) shape with a wide top and a narrow bottom.

Figure 3:
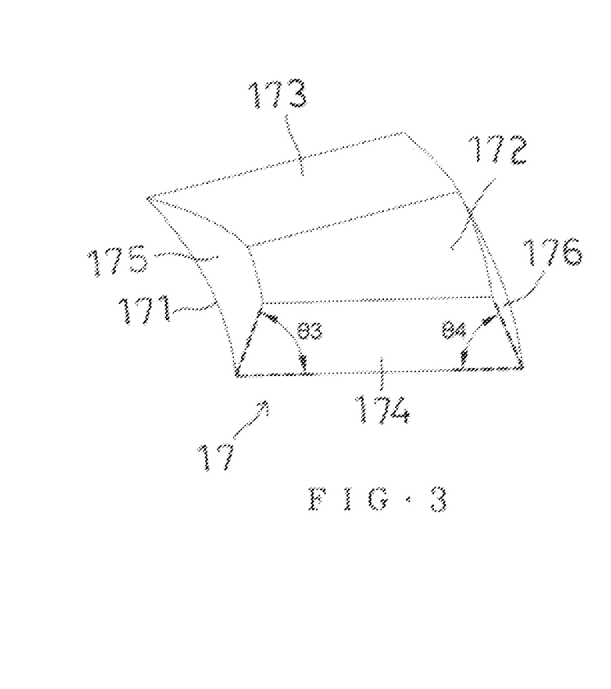
FIG. 3 is a perspective view of a pressing portion of the screw structure in accordance with the preferred embodiment of the present invention.
Figure 4:
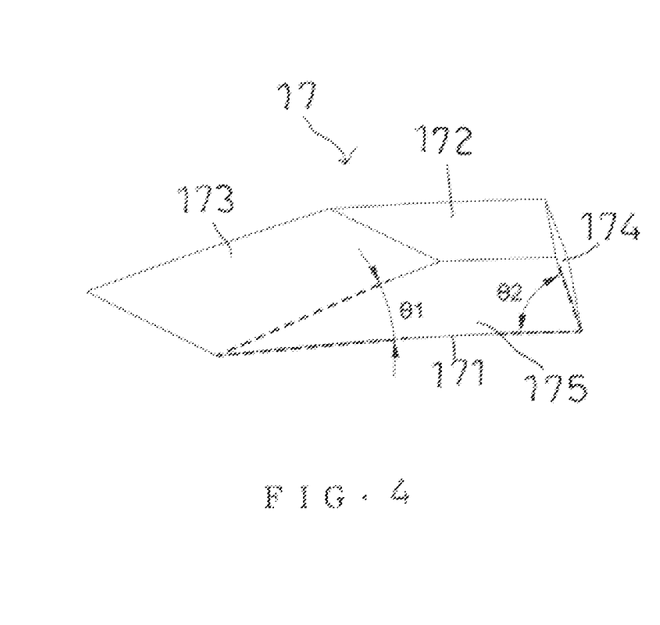
FIG. 4 is another perspective view of the pressing portion of the screw structure in accordance with the preferred embodiment of the present invention.
Figure 5:
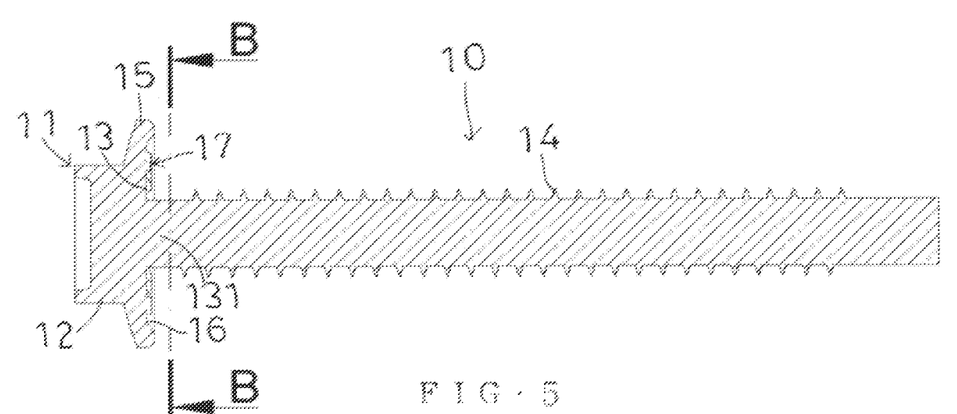
FIG. 5 is a cross-sectional view of the screw of the screw structure in accordance with the preferred embodiment of the present invention.
Figure 6:
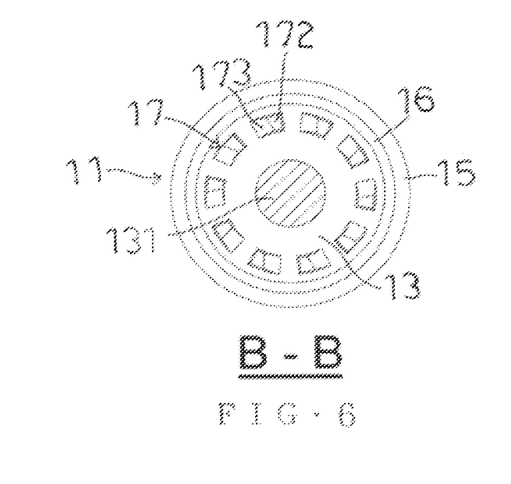
FIG. 6 is a cross-sectional view of the screw of the screw structure taken along line B-B as shown in FIG. 1.

Each of the pressing portions 17 has a top provided with a first plane 171 and a bottom provided with a second plane 172 having an area smaller than that of the first plane 171. Each of the pressing portions 17 has a first side provided with a first inclined face 173, a second side provided with a second inclined face 174, a third side (or an inner edge) provided with a first steep (or abrupt) arcuate face 175, and a fourth side (or an outer edge) provided with a second steep (or abrupt) arcuate face 176.

The first side forming the first inclined face 173 is directed toward a clockwise direction of the screw 10 when the screw 10 is screwed and tightened. A first angle $\theta_1$ is defined between the first inclined face 173 and the first plane 171. The second side forming the second inclined face 174 is directed toward a counterclockwise direction of the screw 10 when the screw 10 is unscrewed and loosened. A second angle $\theta_2$ is defined between the second inclined face 174 and the first plane 171. The third side forming the first steep arcuate face 175 is directed toward the external thread 14. A third angle $\theta_3$ is defined between the first steep arcuate face 175 and the first plane 171. The fourth side forming the second steep arcuate face 176 is directed toward the flange 15. A fourth angle $\theta_4$ is defined between the second steep arcuate face 176 and the first plane 171.

Figure 1:
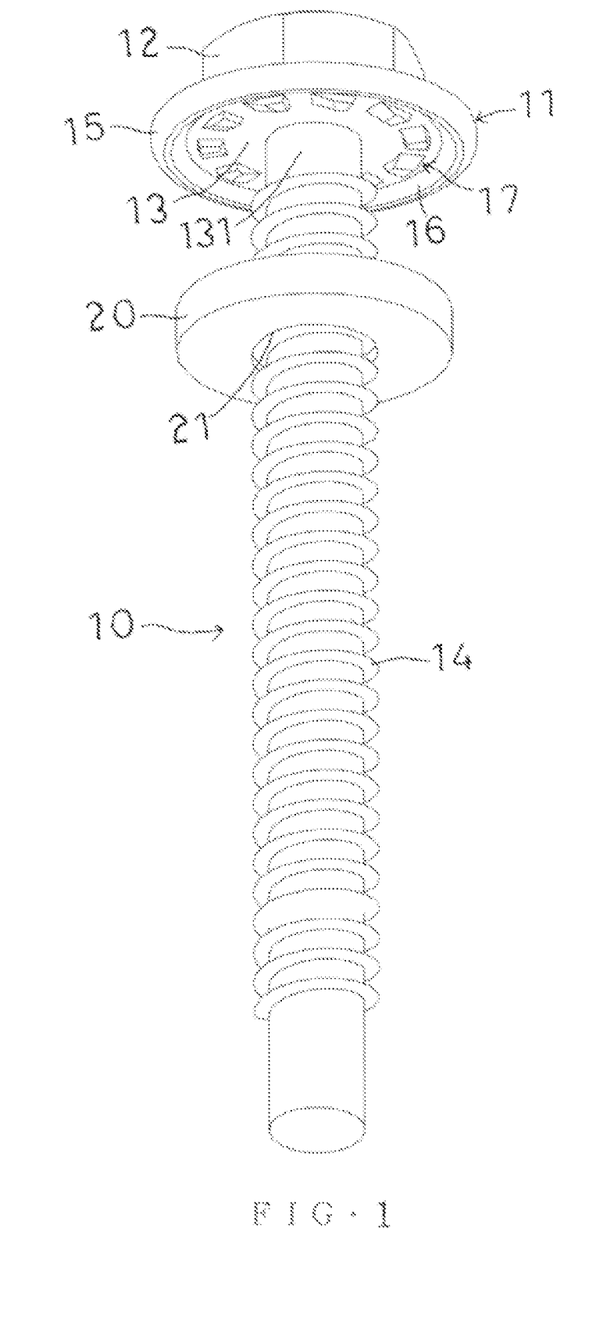
FIG. 1 is a perspective view of a screw structure in accordance with the preferred embodiment of the present invention.
Figure 2:
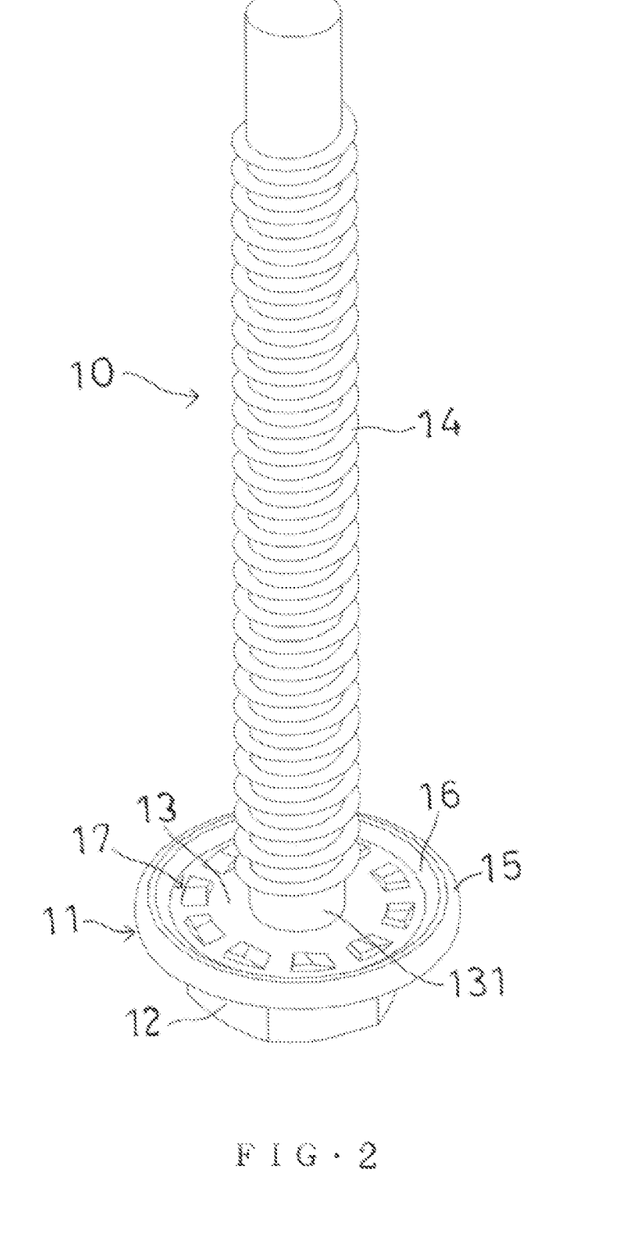
FIG. 2 is a perspective view of a screw of the screw structure in accordance with the preferred embodiment of the present invention.

The washer 20 is made of resilient material. The washer 20 has a center provided with a through hole 21 mounted on the external thread 14 of the screw 10.

Figure 7:
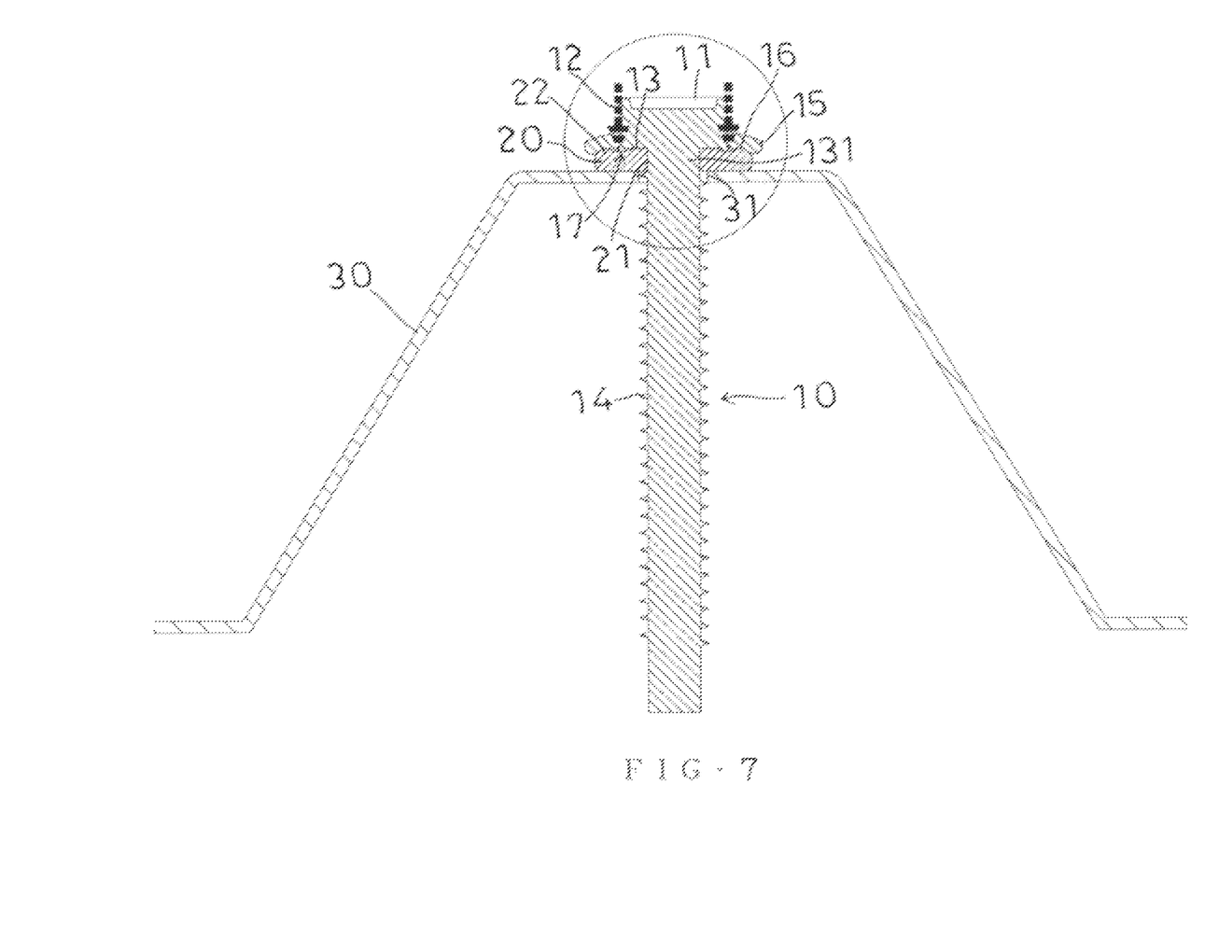
FIG. 7 is a cross-sectional operational view showing that the screw structure is mounted on an article.
Figure 8:
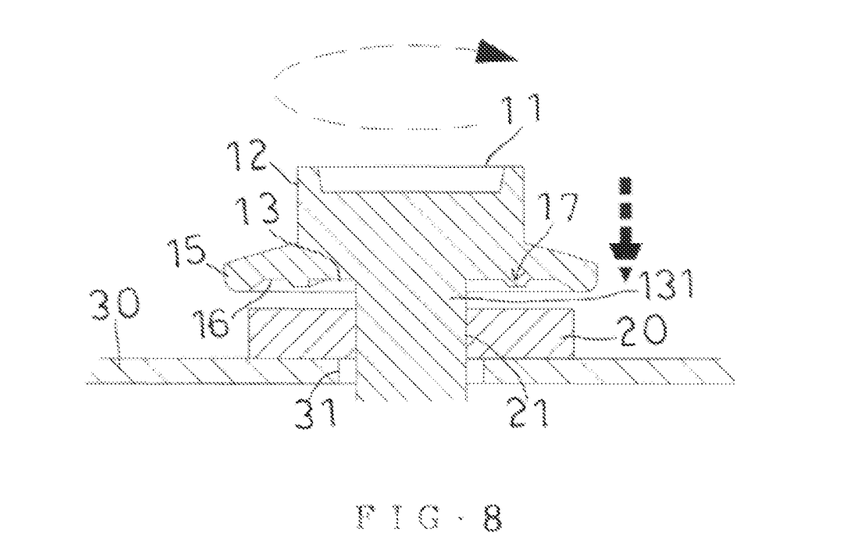
FIG. 8 is a cross-sectional operational view showing that the screw structure is screwed into the article.
Figure 9:
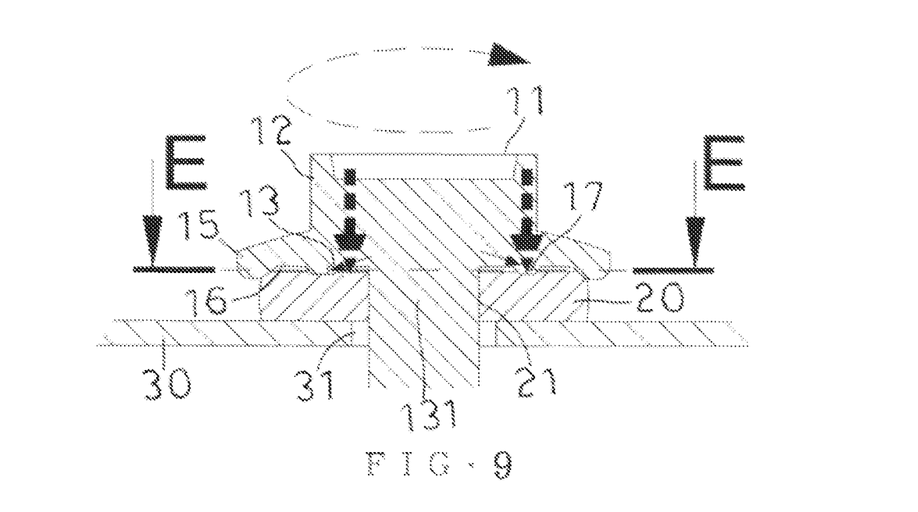
FIG. 9 is a cross-sectional operational view showing that the screw structure is locked onto the article.
Figure 10:
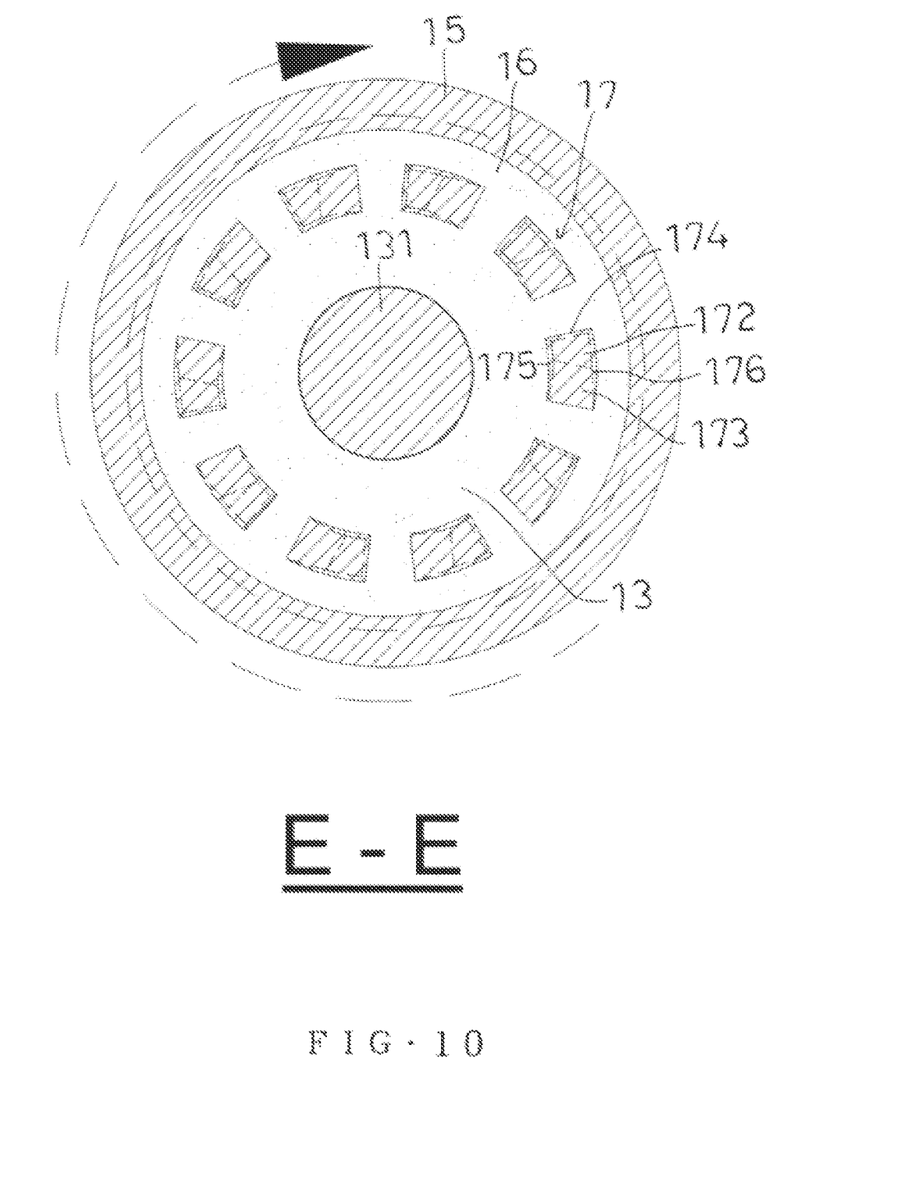
FIG. 10 is a cross-sectional view of the screw structure taken along line E-E as shown in FIG. 9.

In operation, referring to FIGS. 7-10 with reference to FIGS. 1-6, when the rotation portion 12 is rotated by the driving tool, the screw 10 is rotated in the clockwise direction, and the external thread 14 of the screw 10 is screwed into an article 30 which is preferably a corrugated board for baking paint (or baking finish). When the shank 131 of the screw 10 extends through an aperture 31 of the article 30 as shown in FIG. 8, the screw head 11 is moved to touch and press the washer 20, and the washer 20 is compressed between the bottom face 13 of the screw head 11 and the article 30 as shown in FIG. 9, such that the outer diameter of the washer 20 is expanded outward and forms an expansion 22 as shown in FIG. 7. Thus, the screw 10 is screwed and tightened on the article 30. At the same time, when the screw 10 is rotated relative to the washer 20, the washer 20 is gradually moved along and guided by the first inclined face 173 to the second plane 172 of each of the pressing portions 17. At this time, the first inclined face 173 of each of the pressing portions 17 has a smaller inclination by the smaller value of the first angle $\theta_1$, so that the washer 20 will not be rotated in concert with the screw 10 when the screw 10 is rotated in the clockwise direction to be locked onto the article 30, thereby preventing the washer 20 from being worn out or broken due to frequent rubbing. In addition, after the washer 20 is gradually inserted into the second plane 172 of each of the pressing portions 17, the first steep arcuate face 175 of each of the pressing portions 17 has a larger inclination by the larger value of the third angle $\theta_3$, to stop the washer 20 efficiently, and to increase the drag (or resistance) between the washer 20 and each of the pressing portions 17 in a direction parallel with the first plane 171, so that the washer 20 will not slip out easily after the washer 20 is locked by the pressing portions 17. Finally, the pressing portions 17 of the screw 10 press downward and engage the surface of the washer 20 so that the washer 20 is deformed elastically and expanded upward to be filled into the groove 16, thereby finishing the assembly work.

In such a manner, when ambient air or liquid permeates through the flange 15 of the screw head 11, the pressing portions 17 of the screw 10 engage the surface of the washer 20 and apply a pressure on the washer 20 to provide a closely and tightly sealing effect between the screw head 11 of the screw 10 and the washer 20, to prevent the ambient air or liquid from entering the inner face of the article 30, so as to achieve an airtight purpose. Thus, the screw 10 and the washer 20 enhance the sealing effect of the article 30 greatly.

Accordingly, when the screw 10 is screwed into the article 30, the pressing portions 17 of the screw 10 apply a force on the washer 20 so that the washer 20 is deformed elastically, thereby enhancing the sealing effect of the washer 20. In addition, when the screw 10 is rotated relative to the washer 20, the washer 20 is gradually moved along the first inclined face 173 to the second plane 172 of each of the pressing portions 17, so that the washer 20 will not be rotated in concert with the screw 10 and will not be worn out easily. Further, the washer 20 will not slip out easily by provision of the first steep arcuate face 175 of each of the pressing portions 17.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A screw structure comprising:
a screw; and
a washer mounted on the screw;
wherein:
the screw includes a screw head, a rotation portion, and a shank;
the rotation portion is mounted on a top face of the screw head;
the shank is mounted on a bottom face of the screw head;
the shank is provided with an external thread;
the bottom face of the screw head has a periphery provided with a flange;
the flange has an interior provided with a groove;
the bottom face of the screw head is provided with a plurality of pressing portions;
the pressing portions are located between the shank and the groove;
each of the pressing portions has a trapezium shape with a wide top and a narrow bottom;
each of the pressing portions has a top provided with a first plane and a bottom provided with a second plane having an area smaller than that of the first plane;
each of the pressing portions is provided with a first inclined face and a first steep arcuate face;

the first inclined face is directed toward a clockwise direction of the screw when the screw is screwed;

the first steep arcuate face is directed toward the external thread; and when the screw is screwed into an article, the pressing portions press the washer, and an outer diameter of the washer is expanded outward and forms an expansion.

2. The screw structure as claimed in claim 1, wherein:

each of the pressing portions is provided with a second inclined face and a second steep arcuate face;

the second inclined face is directed toward a counter-clockwise direction of the screw when the screw is unscrewed; and the second steep arcuate face is directed toward the flange.

3. The screw structure as claimed in claim 2, wherein:

a first angle is defined between the first inclined face and the first plane;

a second angle is defined between the second inclined face and the first plane;

a third angle is defined between the first steep arcuate face and the first plane; and a fourth angle is defined between the second steep arcuate face and the first plane.

\* \* \* \* \*